(12) United States Patent
Klinke

(10) Patent No.: US 10,959,514 B2
(45) Date of Patent: Mar. 30, 2021

(54) TELESCOPIC COLUMN, PREFERABLY FOR FURNITURE

(71) Applicant: LINAK A/S, Nordborg (DK)

(72) Inventor: Norbert Klinke, Augustenborg (DK)

(73) Assignee: LINAK A/S, Nordborg (DK)

( * ) Notice: Subject to any disclaimer, the term of this patent is extended or adjusted under 35 U.S.C. 154(b) by 418 days.

(21) Appl. No.: 15/608,430

(22) Filed: May 30, 2017

(65) Prior Publication Data

US 2017/0258218 A1 Sep. 14, 2017

Related U.S. Application Data

(62) Division of application No. 13/508,487, filed as application No. PCT/DK2010/000160 on Oct. 29, 2010, now Pat. No. 9,675,170.

(30) Foreign Application Priority Data

Nov. 28, 2009 (DK) .......................... PA 2009 01264

(51) Int. Cl.
*A47L 21/06* (2006.01)
*F16M 11/26* (2006.01)
(Continued)

(52) U.S. Cl.
CPC ................ *A47B 21/06* (2013.01); *A47B 9/00* (2013.01); *A47B 9/04* (2013.01); *A47B 9/20* (2013.01);
(Continued)

(58) Field of Classification Search
CPC ........ F16M 11/26; F16M 11/24; F16M 11/32; F16M 2200/08; F16M 11/18; A47B 9/20;
(Continued)

(56) References Cited

U.S. PATENT DOCUMENTS 1,815,074 A * 7/1931 Schaefer ................. F21S 8/065
248/333
2,592,315 A * 4/1952 Mosley ................... F21V 21/02
248/333

(Continued)

FOREIGN PATENT DOCUMENTS

DE 102007030473 1/2009
DE 102007030473 A1 1/2009
(Continued)

*Primary Examiner* — Jonathan Liu
*Assistant Examiner* — Taylor L Morris
(74) *Attorney, Agent, or Firm* — Dykema Gossett PLLC

(57) ABSTRACT

A telescopic lifting column (1) preferably for furniture, such as height adjustable tables and beds, and comprising at least two mutually telescopic members (2,3,4) and an electric drive unit (5, 10;41,42) for adjusting the telescopic members. The lifting column comprises a telescopic cable guiding device (22;45, 58, 80, 103) for guiding at least one electric cable (29), where the telescopic cable guiding device extends between or in all essentials between the lower and upper end of the lifting column and is connected thereto so that the telescopic cable guiding device collaborates in the telescopic adjustment of the lifting column. Thus the cables may be guided in a protected manner.

17 Claims, 9 Drawing Sheets

(51) Int. Cl.
*A47B 9/00* (2006.01)
*A47B 9/04* (2006.01)
*A61G 7/012* (2006.01)
*A61G 7/018* (2006.01)
*A47B 9/20* (2006.01)
*A47B 21/06* (2006.01)
*F16M 11/28* (2006.01)
*A47B 19/00* (2006.01)
*F16M 11/32* (2006.01)
*A47B 3/091* (2006.01)
*F16M 11/18* (2006.01)

(52) U.S. Cl.
CPC ............ *A61G 7/012* (2013.01); *A61G 7/018* (2013.01); *F16M 11/26* (2013.01); *A47B 3/0913* (2013.01); *A47B 2019/008* (2013.01); *F16M 11/18* (2013.01); *F16M 11/28* (2013.01); *F16M 11/32* (2013.01); *F16M 2200/08* (2013.01)

(58) Field of Classification Search
CPC .. A47B 9/00; A47B 91/16; A47B 9/04; A47B 21/06; A47B 13/023; A47B 9/10; A47B 3/0913; A47B 2021/066; F21V 21/22; F21V 27/00; B66F 11/04; B66F 3/08; B66F 3/10; B66F 7/025; B66F 11/00; A61G 7/012
USPC ................... 248/125.8, 188.5, 326, 333, 616
See application file for complete search history.

(56) References Cited

U.S. PATENT DOCUMENTS

| | | | | |
|---|---|---|---|---|
| 2,890,010 A * | 6/1959 | Barkheimer | ............ | A47B 9/04 108/7 |
| 3,206,188 A * | 9/1965 | Douglass, Jr. | ......... | A61G 13/02 5/614 |
| 3,770,334 A | 11/1973 | Weber | | |
| 3,792,189 A | 2/1974 | Stengel et al. | | |
| 3,799,290 A * | 3/1974 | Fisher | ...................... | B66F 7/20 182/148 |
| 3,822,051 A * | 7/1974 | Karapita | ............. | F16M 11/046 248/333 |
| 3,837,635 A * | 9/1974 | Long | ...................... | A61G 15/02 5/616 |
| 3,859,481 A * | 1/1975 | Sprague | .................. | B64F 1/305 191/12 R |
| 3,868,103 A * | 2/1975 | Pageot | ................... | A61G 13/02 5/614 |
| 3,932,009 A * | 1/1976 | Zollinger | .................. | A47B 9/04 312/312 |
| 3,987,807 A | 10/1976 | Varnell | | |
| 4,008,791 A * | 2/1977 | Shafii-Kahany | ....... | B65H 75/38 191/12.2 R |
| 4,258,825 A * | 3/1981 | Collins | ................... | B66F 11/04 180/321 |
| 4,336,798 A | 6/1982 | Beran | | |
| 4,444,540 A * | 4/1984 | Blatt | .................... | B21D 43/105 414/589 |
| 4,589,642 A * | 5/1986 | Schnelle | ................ | A61G 13/02 5/608 |
| 4,635,492 A * | 1/1987 | Uebelhart | ................ | A47B 9/20 248/405 |
| 4,711,184 A * | 12/1987 | Wallin | .................... | A47B 9/10 108/147 |
| 4,762,072 A | 8/1988 | Boundy et al. | | |
| 4,838,258 A | 6/1989 | Dryden et al. | | |
| 4,852,500 A * | 8/1989 | Ryburg | .................. | A47B 21/03 108/105 |
| 5,112,019 A * | 5/1992 | Metzler | ................ | A61M 3/0241 248/125.2 |
| 5,224,429 A * | 7/1993 | Borgman | ................. | A47B 9/00 108/147 |
| 5,273,132 A * | 12/1993 | Sasaki | ..................... | B66F 11/04 182/113 |
| 5,339,750 A | 8/1994 | Smies | | |
| 5,394,809 A * | 3/1995 | Feldpausch | ............. | A47B 9/00 108/147.21 |
| 5,428,928 A * | 7/1995 | Hellwig | ................. | A47B 21/06 108/147 |
| 5,540,160 A * | 7/1996 | Rea | ....................... | A47C 9/022 112/217.2 |
| 5,553,550 A * | 9/1996 | Doyle | ..................... | A47B 9/00 108/147 |
| 5,802,988 A * | 9/1998 | Shields | .................... | A47B 9/10 108/147 |
| 5,934,203 A * | 8/1999 | Glass | .................... | A47B 13/003 108/156 |
| 5,941,182 A * | 8/1999 | Greene | ..................... | A47B 9/12 108/147 |
| 6,026,970 A * | 2/2000 | Sturm, Jr. | ............. | B66C 23/706 212/348 |
| 6,095,476 A * | 8/2000 | Mathis | .................... | F16M 11/10 108/7 |
| RE37,559 E * | 2/2002 | Marue | ....................... | B60P 3/18 248/188.5 |
| 6,352,037 B1 * | 3/2002 | Doyle | ..................... | A47B 9/00 108/147 |
| 6,435,048 B1 * | 8/2002 | Zimmerman | ............ | A47B 9/04 108/147 |
| 6,443,702 B1 * | 9/2002 | Ross | ...................... | F04D 25/088 248/333 |
| 6,505,365 B1 * | 1/2003 | Hanson | .................. | A61G 7/005 5/510 |
| 6,540,191 B2 * | 4/2003 | Liu | ........................... | A47B 9/04 108/147 |
| 6,595,144 B1 * | 7/2003 | Doyle | ..................... | A47B 9/00 108/147 |
| 6,717,053 B2 * | 4/2004 | Rupert | ..................... | H02G 3/14 174/53 |
| 6,817,684 B2 * | 11/2004 | Cattaneo | ................ | A47B 21/06 108/50.02 |
| 6,874,500 B2 | 4/2005 | Fukunaga et al. | | |
| 6,875,924 B2 | 4/2005 | Porter et al. | | |
| 6,886,200 B2 * | 5/2005 | Blyshak | .................. | A61G 13/02 254/93 R |
| 6,971,911 B2 * | 12/2005 | Ramsey | .................. | A47B 21/06 248/231.71 |
| 6,986,310 B2 * | 1/2006 | Calfas | ................... | A61G 5/1059 108/147 |
| 7,077,165 B2 | 7/2006 | Takasaki et al. | | |
| 7,163,184 B2 | 1/2007 | Nielsen | | |
| 7,183,502 B1 | 2/2007 | Johnston et al. | | |
| 7,458,562 B1 * | 12/2008 | Chen | ......................... | B66F 3/10 254/103 |
| 7,495,359 B2 | 2/2009 | Klinke et al. | | |
| 7,506,560 B2 | 3/2009 | Klinke | | |
| 7,647,659 B2 | 1/2010 | Frolik et al. | | |
| 7,712,389 B2 * | 5/2010 | Wang | ..................... | F16H 25/20 254/102 |
| 7,810,793 B1 * | 10/2010 | Chiang | ..................... | B66F 3/10 254/397 |
| 7,856,900 B2 * | 12/2010 | Benoit | ................. | F16H 25/2015 74/89.23 |
| 7,862,409 B1 * | 1/2011 | Sheppard | ........... | A22C 17/0033 452/198 |
| 7,908,981 B2 * | 3/2011 | Agee | ....................... | A47B 9/04 108/147 |
| 8,360,536 B2 * | 1/2013 | Garg | ....................... | H02G 3/083 108/50.02 |
| 8,776,289 B2 * | 7/2014 | Ko | ......................... | A61G 7/0005 5/611 |
| 9,655,438 B1 * | 5/2017 | Shoenfeld | ................ | A47B 9/20 |
| 9,675,170 B2 | 6/2017 | Klinke | | |
| 9,723,920 B1 * | 8/2017 | Wu | ......................... | A47B 21/02 |
| 9,743,754 B2 * | 8/2017 | Ergun | ....................... | A47B 9/02 |
| 9,849,584 B1 * | 12/2017 | Liu | ....................... | H02J 7/0055 |

(56) References Cited

U.S. PATENT DOCUMENTS

| | | | |
|---|---|---|---|
| 9,878,889 B2* | 1/2018 | Watson | B66F 11/046 |
| 9,936,802 B1* | 4/2018 | Newhouse | A47B 21/06 |
| 10,381,808 B2* | 8/2019 | Byrne | A47B 21/06 |
| 2002/0162410 A1* | 11/2002 | Zimmerman | A47B 9/04 |
| | | | 74/89.35 |
| 2003/0185515 A1* | 10/2003 | Lubkert | G06F 1/266 |
| | | | 385/48 |
| 2004/0026998 A1* | 2/2004 | Henriott | A47B 21/06 |
| | | | 307/9.1 |
| 2005/0150437 A1* | 7/2005 | Chen | A47B 9/10 |
| | | | 108/147 |
| 2005/0275323 A1* | 12/2005 | Wilhelm | A47B 9/04 |
| | | | 312/319.5 |
| 2006/0086867 A1* | 4/2006 | Wang | A47F 5/025 |
| | | | 248/125.8 |
| 2006/0130713 A1 | 6/2006 | Jones et al. | |
| 2007/0251014 A1 | 11/2007 | Newkirk et al. | |
| 2007/0295571 A1 | 12/2007 | Tong | |
| 2008/0143097 A1 | 6/2008 | Canale | |
| 2008/0149420 A1* | 6/2008 | Cheatham | B60R 9/06 |
| | | | 182/63.1 |
| 2008/0193291 A1* | 8/2008 | Ware | F04D 25/088 |
| | | | 416/5 |
| 2010/0126393 A1* | 5/2010 | Moller | A47B 9/04 |
| | | | 108/147 |
| 2010/0187379 A1 | 7/2010 | Kragh et al. | |
| 2010/0237305 A1* | 9/2010 | Miller | B66F 7/02 |
| | | | 254/358 |
| 2010/0287726 A1 | 11/2010 | Cordes et al. | |
| 2010/0301186 A1* | 12/2010 | Chuang | A47B 9/00 |
| | | | 248/422 |
| 2011/0120243 A1* | 5/2011 | Pettersson | A47B 9/04 |
| | | | 74/89.28 |
| 2012/0312196 A1* | 12/2012 | Newkirk | H02J 7/025 |
| | | | 108/23 |
| 2013/0248242 A1* | 9/2013 | Beldock | A47B 9/14 |
| | | | 174/493 |
| 2014/0312754 A1* | 10/2014 | Hecht | A47B 9/04 |
| | | | 312/309 |
| 2017/0099943 A1* | 4/2017 | Joshi | B60B 33/021 |

FOREIGN PATENT DOCUMENTS

| | | |
|---|---|---|
| WO | 2004/100632 A1 | 11/2004 |
| WO | 2004100632 | 11/2004 |

* cited by examiner

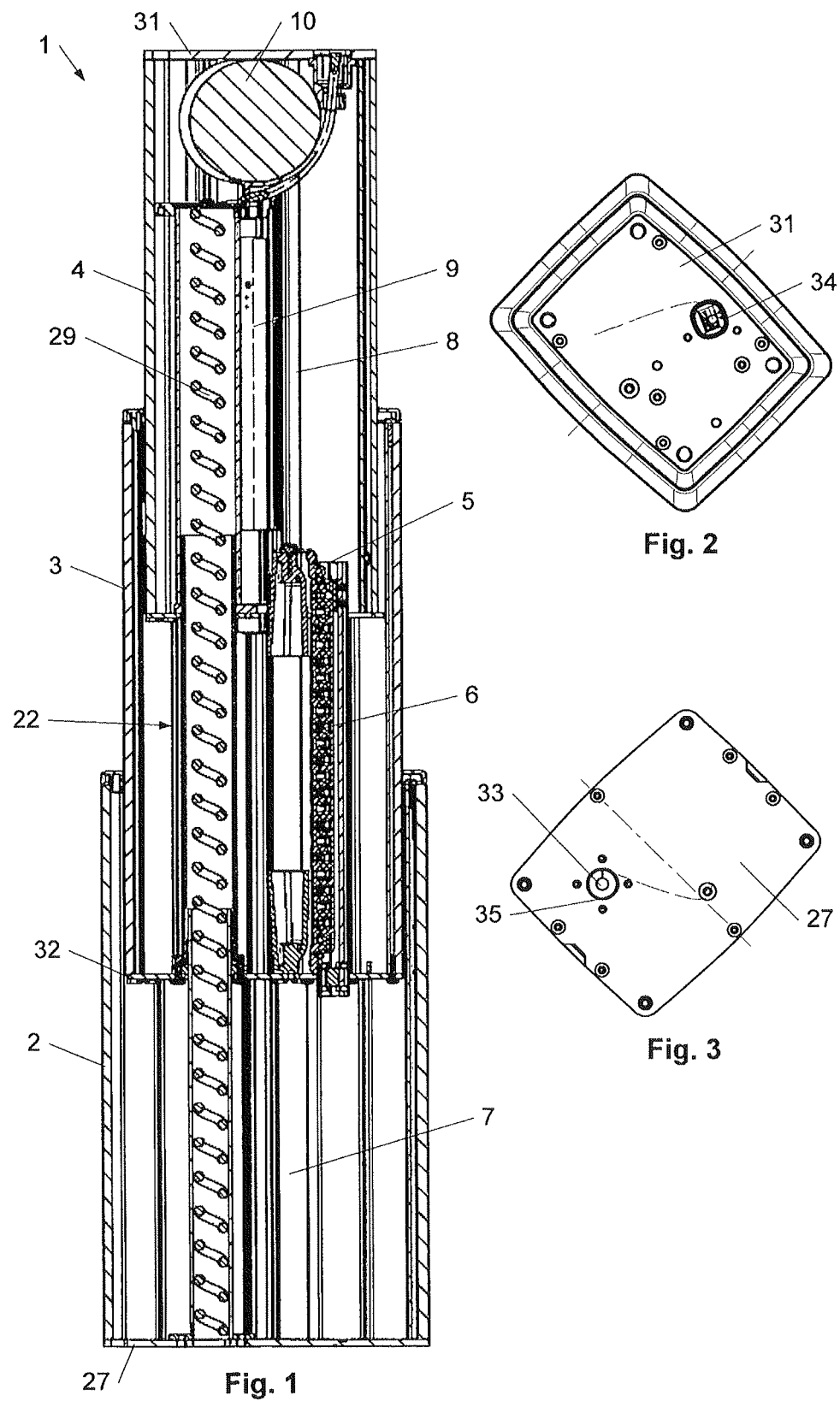

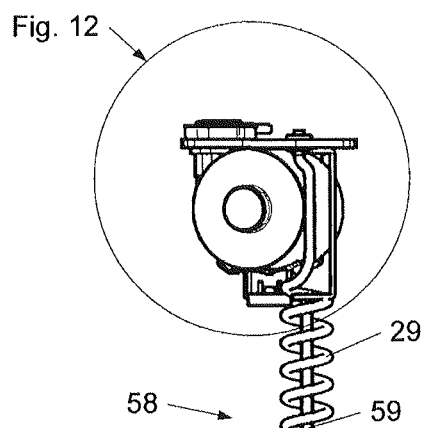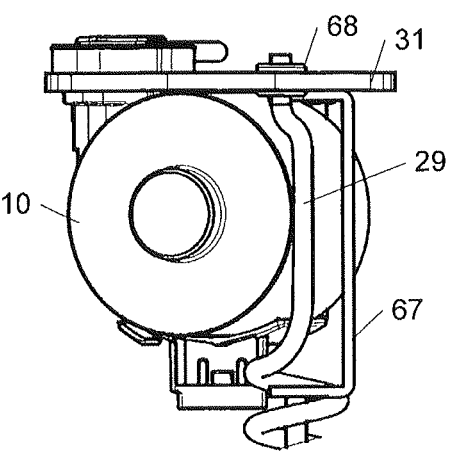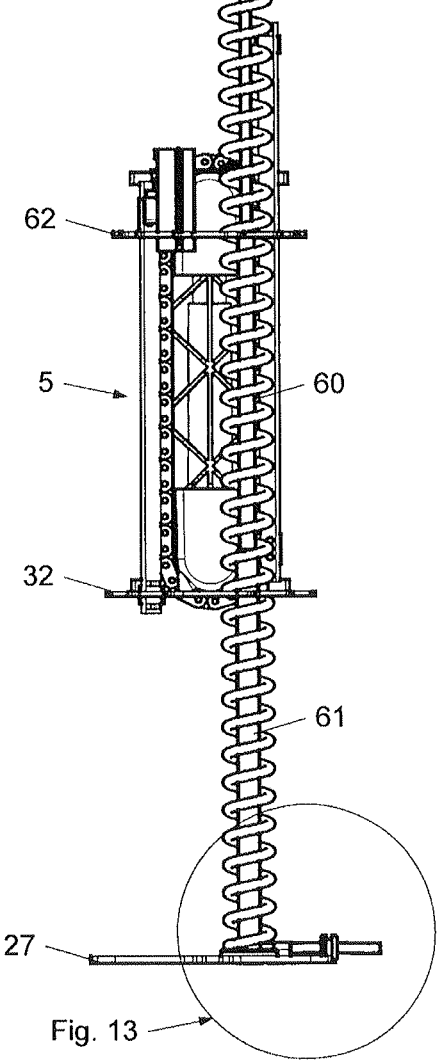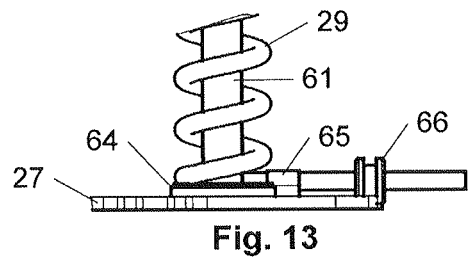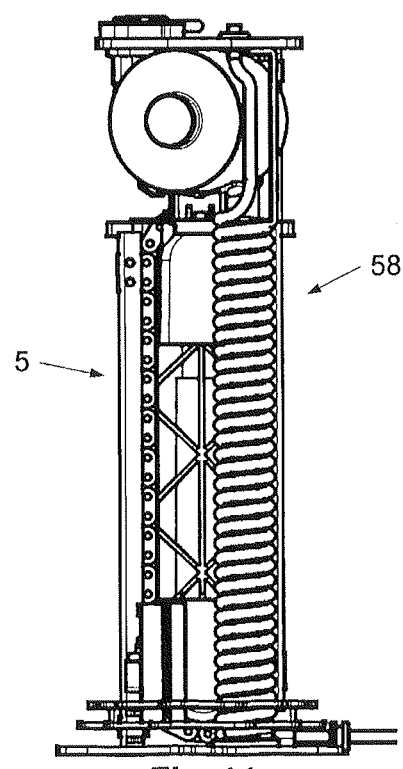
Fig. 11  Fig. 12  Fig. 13  Fig. 14

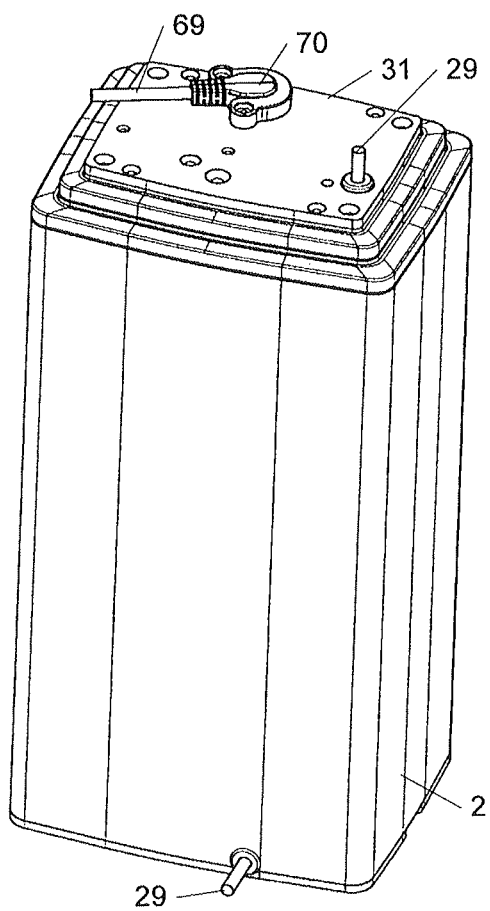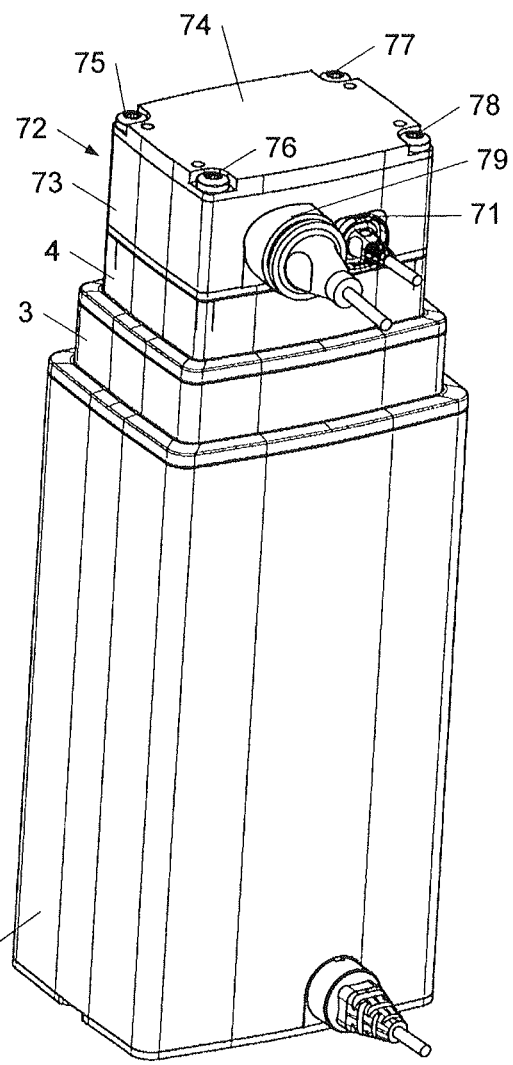
Fig. 15  Fig. 16
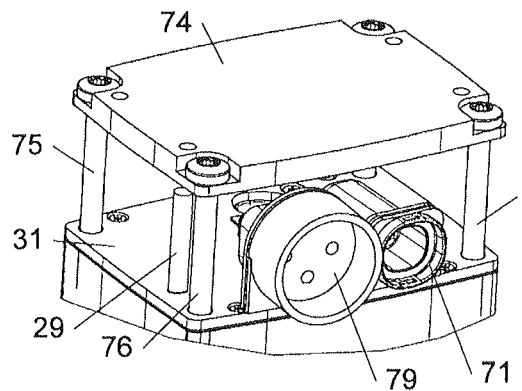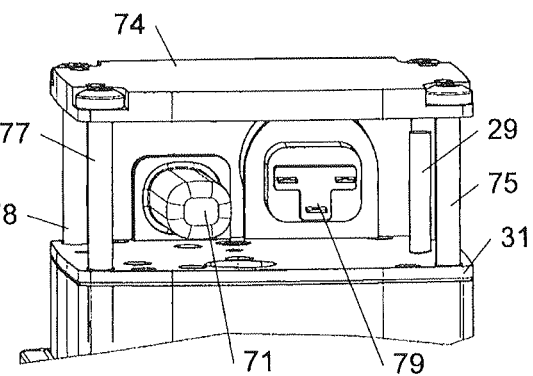
Fig. 17  Fig. 18

TELESCOPIC COLUMN, PREFERABLY FOR FURNITURE

CROSS-REFERENCE TO RELATED APPLICATION

This application is a division of U.S. patent application Ser. No. 13/508,487, filed May 7, 2012, which was a U.S. national stage of PCT/DK2010/000160, filed Oct. 29, 2010, which in turn claimed priority of Danish Application 2009 01264, filed Nov. 28, 2009. All priority are claimed

BACKGROUND OF THE INVENTION

Field of the Invention

The present invention relates to a telescopic column and to a telescopic cable guiding device and a telescopic lifting column prepared for mounting of a telescopic cable guiding device.

The Prior Art

Electrically-driven lifting columns constructed as table legs for height-adjustable tables have become well-known, just as electrically-driven lifting columns for hospital and care beds are well-known. Example of these types of lifting columns are found in WO/2004/040169 A1 and WO 2009/033486 A1, both Linak A/S. The electrically driven lifting columns are as a minimum in general connected to a power supply and an operation panel. On a desk there is typically also a computer with internet access, a desk lamp, telephone, etc., resulting in a welter of cables. This welter of cables is even more distinct in terms of hospital beds, where, besides the lifting columns, at least two linear actuators are connected for adjusting the slatted frame into a desired contour. Further, a control panel (ACP) for the staff is typically located at the foot of the bed, just as other equipment requiring a cabled connection may be connected to the bed.

Besides the fact that the welter of cables per se may cause accidents either as a result of the cables being incorrectly connected or the cables getting caught in something and thus ripping something off the table or bed or getting torn apart, the cables may also get squeezed in the structure and thus, at worst, be torn partially apart causing them to short-circuit. WO 03/003876 Linak A/S discloses a three-part electrically driven telescopic lifting column for desks, where the lifting column is driven by an endless chain equipped with two rods, which are extended outwards in opposite directions. Here, a cable is received in a hollow in a bar-shaped element, around which the drive unit is constructed. This invention, however, only relates to guiding of one cable and is dedicated to the specific construction of the lifting column. WO 2007/112704 A1 Linet Spol. S.R.O. discloses an electrically driven telescopic lifting column for hospital beds, where an electric cable, based on fork-lift-like principle, is guided over a roll at the end of a vertical rod, in the intermediate member of a three-member lifting column.

The purpose of the invention is to provide a constructive simple solution for at least reducing the welter of cables.

This is achieved according to the invention by constructing the telescopic lifting column to include a telescopic cable guiding device for guiding at least one electric cable which collaborates in the movement of the telescopic lifting column. As such, it is possible to keep track of the cable guiding. Since the telescopic cable guiding device should not transfer forces, and since its members does not have to be extended synchronous, even in case of a synchronous lifting column, the telescopic cable guiding device may be manufactured from simple materials in a relatively simple manner and thus be inexpensive.

In one embodiment, the telescopic cable guiding device is constituted by telescopic rods, having the cable/cables secured thereto. In another embodiment the telescopic cable guiding device is constituted by a telescopic tube, with the cables being guided inside the tube. It is also possible to place the cables on the outside of the tube or a combination thereof, i.e. both inside and outside the tube. When the cable is guided inside the telescopic tube, it gives the advantage that the cables are well-protected. The telescopic tube may be a simple plastic tube, but may also consist of thin rods assembled to form a tube-shape.

The telescopic cable guiding device may be placed outside the telescopic lifting column, which makes sense, when the telescopic cable guiding device is a telescopic tube. The location outside the telescopic column is particularly relevant when the cross section of said column is small or its hollow is filled with other equipment. It may of cause also be a combination of a telescopic cable guiding device located both inside and outside the telescopic column. This is attractive in case of a large bundle of cables or cables running at a relatively long distance from each other.

Expediently, the telescopic cable guiding device will have as many telescopic members and be the same or almost the same length as the telescopic members of the lifting column. This gives advantages in the assembly process solely due to the fact that the number of telescopic members thus is as small as possible. It is however evident that the telescopic cable guiding device may have more members than the lifting column when appropriate.

Expediently, the telescopic cable guiding device terminates, at least with one end, in one end of the lifting column. This facilitates the assembly process of the telescopic cable guiding device.

In an embodiment, the telescopic cable guiding device comprises at least one electric cable running from one end of the telescopic cable guiding device to the other and at least in one end terminates in a plug. The telescopic cable guiding device may thus in advance be equipped with the desired cables. Extern cables may then simply be connected with a plug. In this connection it is noted that a plug may very well be a branch plug with more outlets.

In an embodiment, this or these plug/s are comprised by a plug module, which expediently may be mounted in extension of one end of the lifting column. The lifting column may also comprise a plug module in extension of each end of the lifting column. The plug module may further be adapted to comprise exactly the required type of plugs and the number of these.

The invention further relates to a telescopic cable guiding device for use in a lifting column, comprising at least two telescopically arranged profiles and means for securing the cable guiding device to the lifting column. The telescopic cable guiding device may expediently be constructed as a finished unit, which may comprise a desired number and type of cables and a desired number and type of plugs intended for mounting in or in connection with a lifting column.

The invention further relates to a telescopic lifting column prepared for mounting of a telescopic cable guiding device for guiding cables. The telescopic lifting column may thus be designed with a shaft-shaped hollow in its longitudinal direction terminating in an opening in a top plate and bottom plate, respectively. Thus, the telescopic cable guiding device may simply be inserted into the hollow and be secured to the top and bottom of the lifting column or in the vicinity thereof. The lifting column may be prepared for mounting of a telescopic cable guiding device by e.g. comprising mounting holes in the top and bottom plate. These holes may, if not used, be closed with a plug, which is pulled out when mounting the cable guiding device. For mounting of the telescopic device, the respective ends may comprise a collar which through a snap-lock connection may be secured in the hole in the top and bottom plate of the lifting columns. Thus, the telescopic cable guiding device may in a simple and quick manner be mounted and dismounted without the risk of impacting or damaging the other parts of the lifting column.

The characteristics of the telescopic cable guiding device as a finished unit and the fact that it basically does not have to be part of the lifting column, makes it suitable for e.g. retrofitting in or in connection with the lifting column, which is prepared for this purpose. In case a need for an additional cable guiding or an increased number of cable guides should arise after commenced use of the lifting column, this is also possible. Likewise, a telescopic cable guiding device may be dismounted and remounted on or in connection with another lifting column. In line with this line of thinking, the plug module may likewise be retrofitted and configured to the needs at hand.

BRIEF DESCRIPTION OF THE DRAWINGS

The invention will be explained more fully below with reference to the accompanying drawings, in which FIG. 1 shows a longitudinal section through a lifting column for beds, where the lifting column is shown in its fully extended position, FIG. 2 shows a top plan view of the lifting column, FIG. 3 shows a bottom plan view of the lifting column, FIG. 11 shows an alternative embodiment of the telescopic cable guiding device, shown internally from the telescopic lifting column, FIG. 12 shows a detailed drawing of the upper end of the telescopic lifting column in FIG. 11, FIG. 13 shows a detailed drawing of the lower end of the telescopic lifting column in FIG. 11, FIG. 14 shows the telescopic lifting column in FIG. 1, FIG. 15 shows the telescopic lifting column in FIG. 1, shown in perspective, FIG. 16 shows the telescopic lifting column in FIG. 1 comprising a plug module, shown in perspective, FIG. 17 shows the plug module in FIG. 16, shown in perspective from the front, where the profile piece has been removed, FIG. 18 shows the plug module in FIG. 16, shown in perspective from the rear, where the profile piece has been removed.

DETAILED DESCRIPTION OF THE PREFERRED EMBODIMENTS

Figure 4:
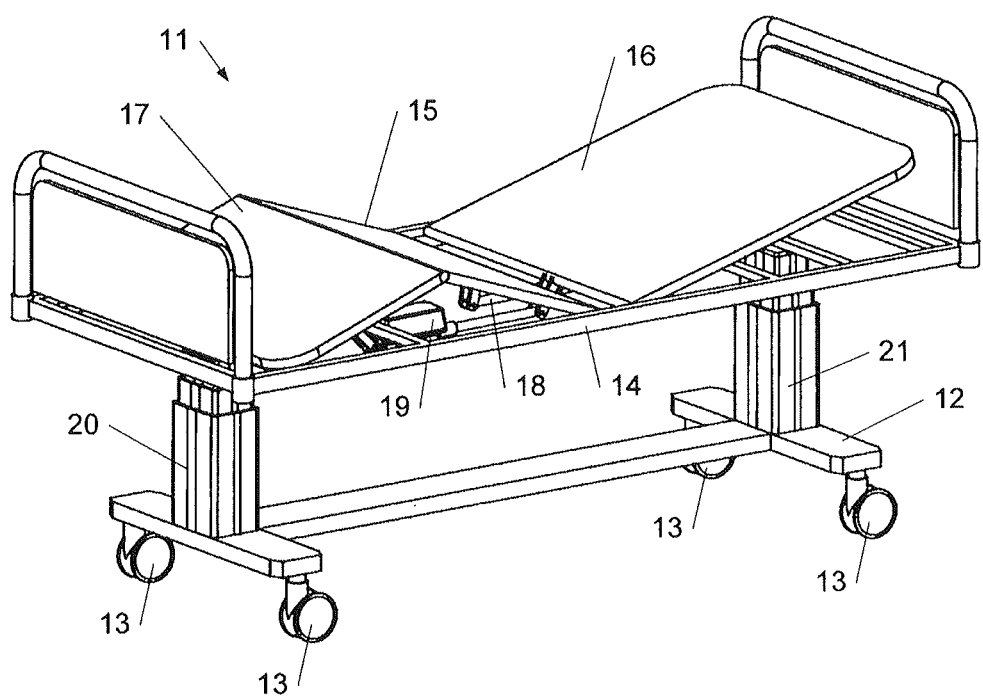
FIG. 4 shows a schematic view of a bed.

FIG. 1 shows a cross section of a three-part telescopic lifting column 1 for beds of the type disclosed in WO2009/033486 A Linak A/S which hereby constitutes part of the present application. The FIGS. 2 and 3 show the telescopic lifting column 1 shown from the top and bottom, respectively. As it appears from FIG. 1, the telescopic lifting column 1 consist of an outermost member 2, an intermediate member 3, and an innermost member 4. The telescopic lifting column 1 is driven by a chain unit 5, secured to the intermediate member 3. The chain unit 5 comprises an endless chain 6, running over two chain wheels (not referred to in the drawing). To each of the chain lengths between the chain wheels, a rod 7,8 is secured to one end, whose other end is secured to the outermost member 2 and the innermost member 4, respectively. The chain unit 5 is driven by a drive unit comprising a spindle 9 driven by an electric motor 10 over a reduction gear (not shown). The drive unit is secured to the top of the innermost member 4. The spindle 9 is in mesh with a spindle nut (not shown) in the chain unit 5. By rotating the spindle 9 for extending the column, the chain unit 5 will be displaced, at which the chain is brought to move and the two rods 7,8 will be displaced and thus synchronous raise the intermediate member 3 out of the outermost member 2 while the innermost member 4 is extended out of the intermediate member 3. Depending on the direction of rotation of the spindle, the column will extend or retract, respectively.

In FIG. 4 shows a schematic view of a hospital bed 11, comprising a lower frame 12 equipped with drive wheels 13 and an upper frame 14 with a supporting surface for the mattress. This supporting surface consist of a middle section 15 fixed in the upper frame 14, an adjustable back rest section 16 and an adjustable leg rest section 17. The two latter sections 16,17 may be adjusted by means of linear actuators 18,19. The upper frame 14 may as a whole be raised and lowered by means of a lifting column 20,21 at each end. The bed may be operated with hand controls (not shown) and a control panel (ACP, Actuator Control Panel), located at the foot of the bed (not shown). As it appears, the lifting columns 20,21 are secured to the lower frame 12 with the outermost member 2, so that both ends of the lifting columns 20,21 are accessible.

Figure 5:
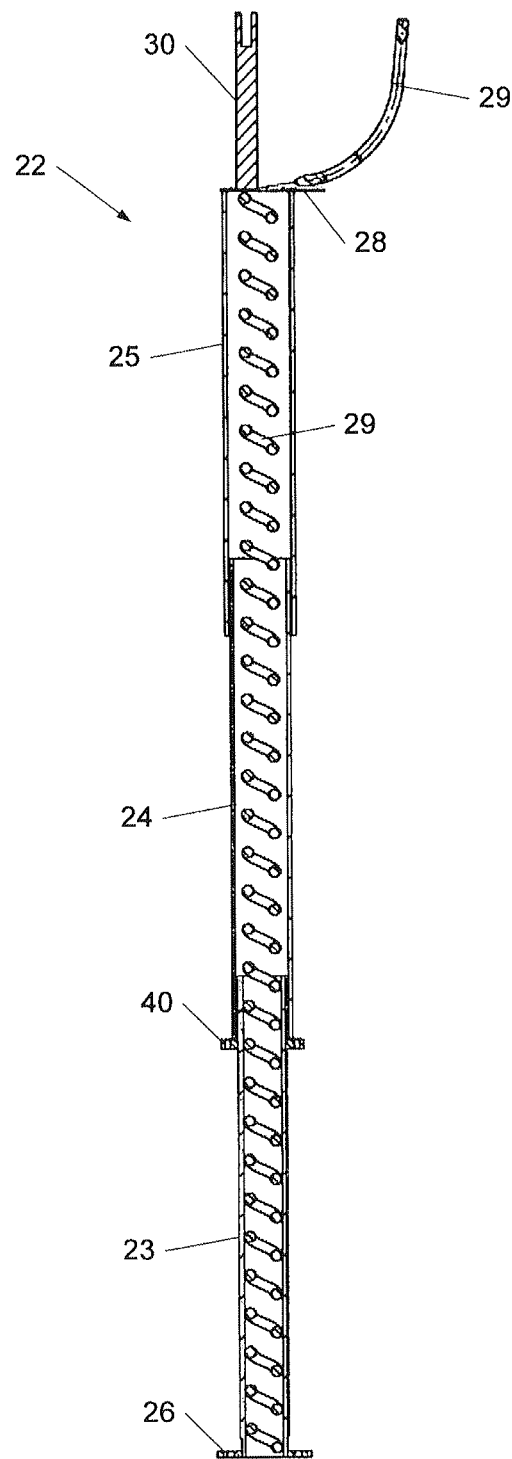
FIG. 5 shows a telescopic cable guiding device for guiding of cables, shown in a fully extended position.
Figure 6:
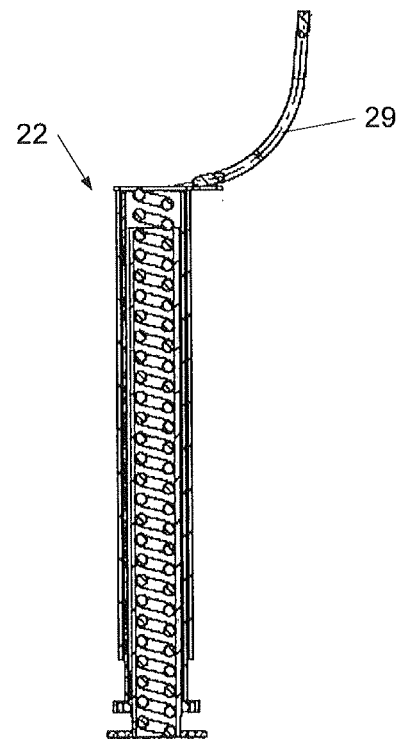
FIG. 6 shows a telescopic cable guiding device in FIG. 5, shown in retracted position.

For guiding the cables, the lifting columns are, as it appears from FIG. 1, equipped with a telescopic cable guiding device 22 designed as three telescopically arranged tubes 23, 24, 25. A longitudinal section in the telescopic cable guiding unit 22 is shown separately in FIGS. 5 and 6, in extended and retracted position, respectively. The telescopic cable guiding device 22 consists, like the column, of three telescopically arranged tubes 23, 24, 25. The innermost tube 23 of the telescopic cable guiding device 22 is, with its lower end, secured through the collar 26 to a bottom plate 27 in the outermost member 2. The upper end of the outermost tube 25 is closed with a top plate 28 having a hole (not shown) through which the cable 29 may be guided. The top plate 28 is through an extension piece 30 secured to the top plate 31 mounted on the upper end of the innermost member 4 of the lifting column 1. The telescopic cable guiding 22 thus extends and retracts concurrently with the movement of the lifting column 1. As stated above, the innermost and intermediate member 3, 4 moves synchronous. A synchronous movement of the members is not necessary for the telescopic cable guiding device 22, as it is hidden. Ideally, the intermediate tube 24 is brought along by the outermost tube 25 in that the latter, at its lower end, has an internal dog (not shown), which is caught in an external dog (not shown) in the upper end of the intermediate tube 24. Whether or not the friction between the two tubes 24, 25 causes the intermediate tube 24 to be brought along from the beginning is of secondary importance. The dimensional tolerance between the individual tubes 23, 24, 25 is thus not critical, for which reason some play may unproblematically occur mutually between the individual tubes 23, 24, 25. The fitting between the individual tubes 23, 24, 25 should thus not necessarily be constructed with e.g. price-raising sliders. In its extended position, the intermediate tube 24 is stopped in that an external dog 40 is secured to a die-cut bottom plate 32 mounted in the lower end of the intermediate member 3. The telescopic cable guiding device 22 terminates in a hole 33 in the bottom plate 27. As it appears, a spiral cable 29 is located in the telescopic cable guiding device 22. From the hole (not shown) in the top plate 28 of the outermost tube 25, the spiral cable 29 is further guided to the top plate 31 of the lifting column, where it terminates in a plug 34. At the bottom of the lifting column 1, the spiral cable 29 is led through a sleeve 35 in the hole 33 in the bottom plate 27. It is noted that the cable 29 here could also terminate in a plug. The cable 29 is thus well-protected in the tubular telescopic cable guiding device 22 without the risk of being squeezed in the lifting column 1. The external cable guiding is thus also facilitated, as the cables may be connected to the lifting column 1 with plugs. Only one cable 29 is shown here, but more cables may be arranged in the telescopic cable guiding device 22.

Figure 7:
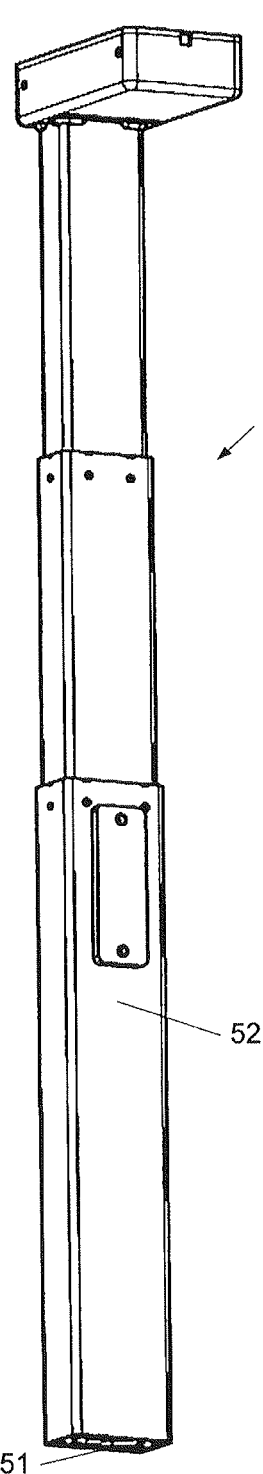
FIG. 7 shows a schematic view of a lifting column for a desk, as shown in FIG. 10, where the lifting column is shown in its fully extended position.
Figure 8:
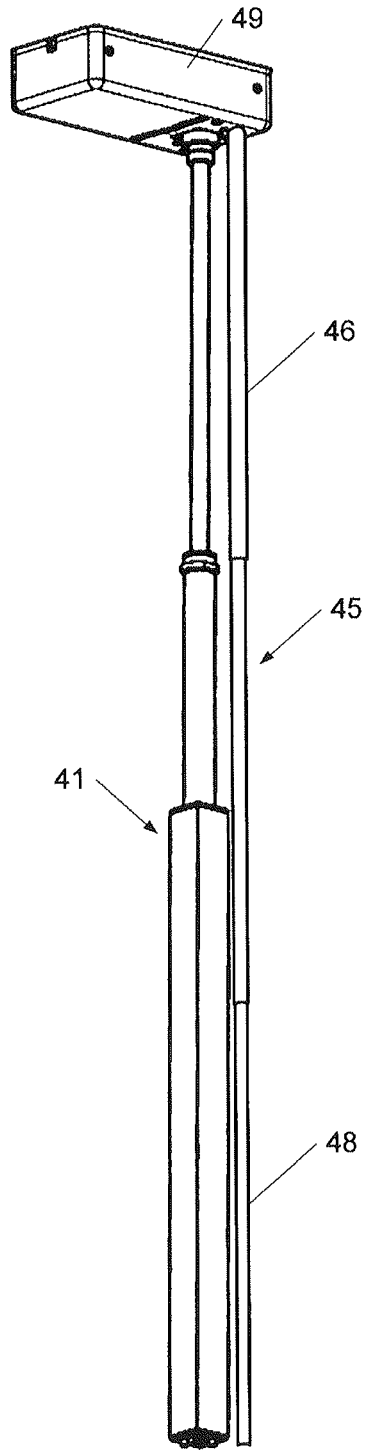
FIG. 8 shows a linear actuator for the lifting column, shown in FIG. 7.
Figure 27:
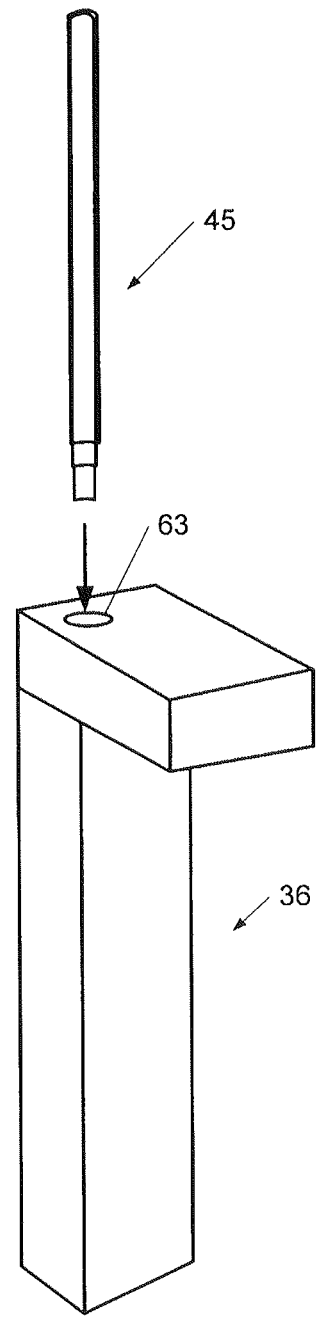
FIG. 27 shows a lifting column in retracted position having a shaft-shaped hollow and with the telescopic cable guiding device during mounting in the column.
Figure 9:
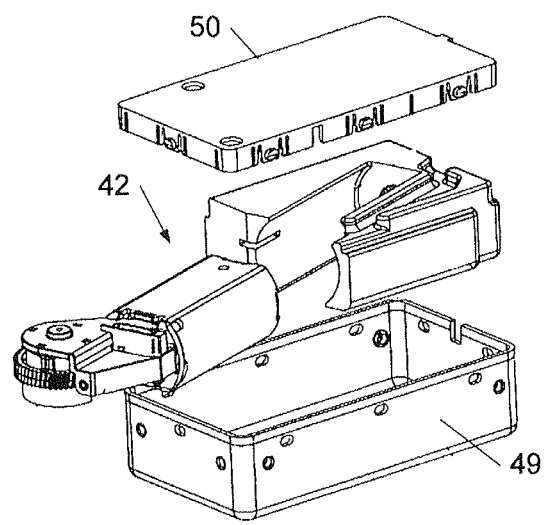
FIG. 9 shows an exploded view of the housing with motor unit for the linear actuator, shown in FIG. 8.
Figure 10:
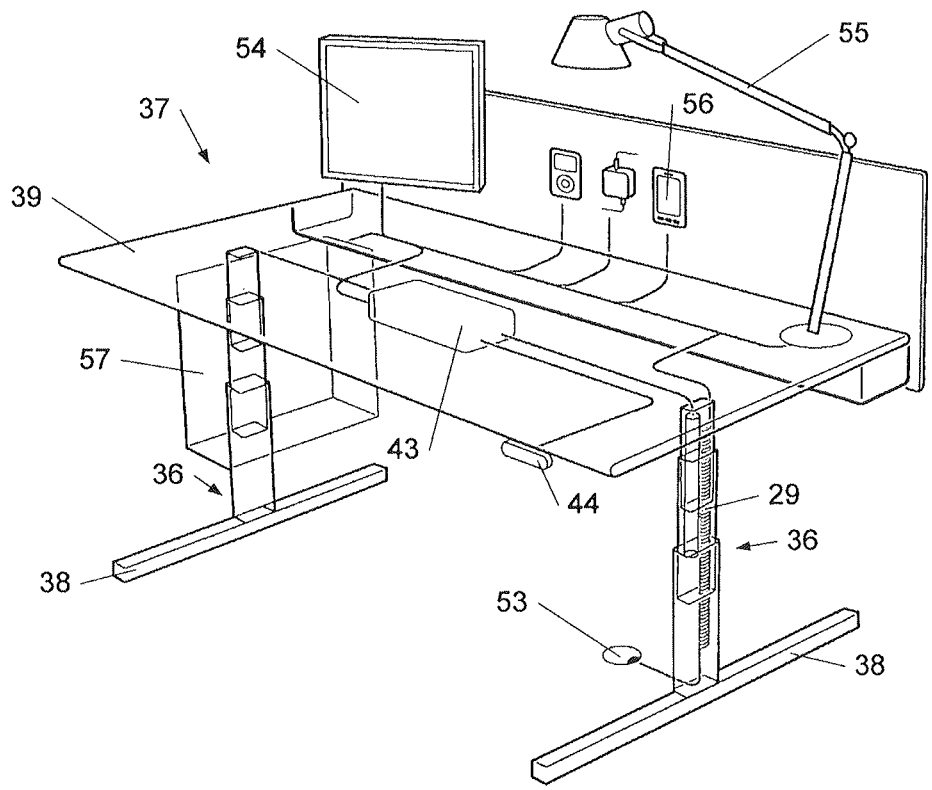
FIG. 10 shows a schematic perspective of a height-adjustable desk, shown with a transparent table top.
Figures 19, 20, 21:
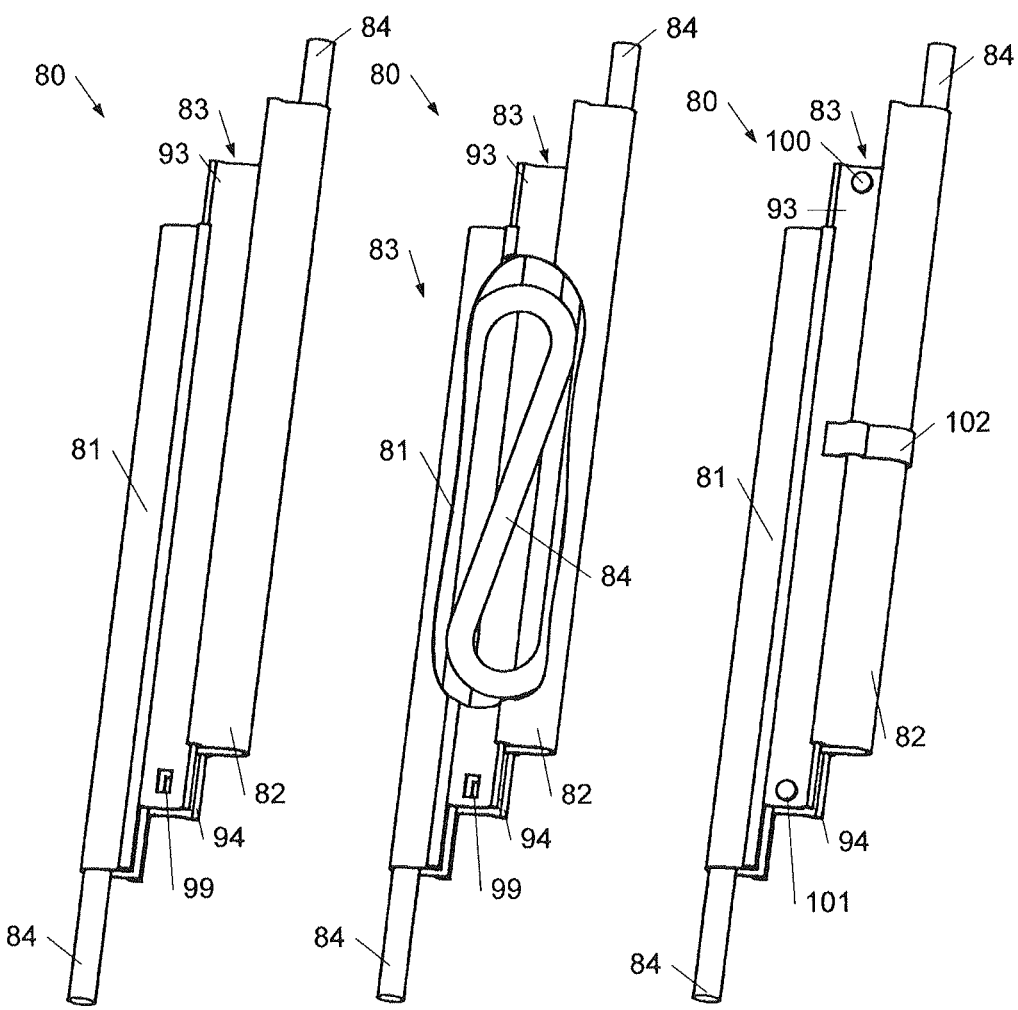
FIG. 19 shows an embodiment of a telescopic cable guiding device comprising a cable, shown in perspective.
FIG. 20 shows the telescopic cable guiding device in FIG. 19 with a cut-away in the telescopically arranged profiles.
FIG. 21 shows the telescopic cable guiding unit in FIG. 19 comprising an alternative embodiment for ensuring the relative movement between the profiles.
Figures 22, 23:
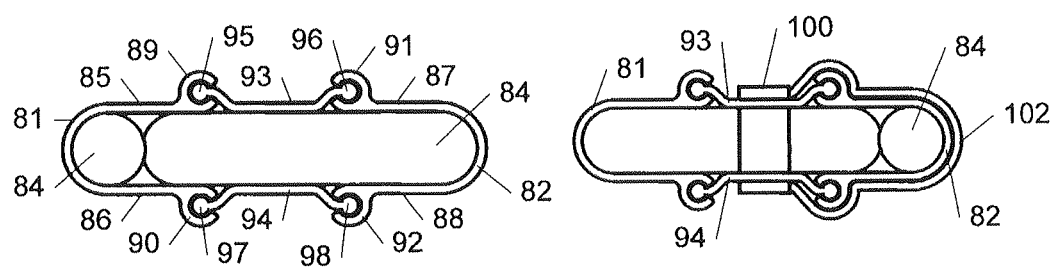
FIG. 22 shows the telescopic cable guiding device in FIG. 19, shown from the end of the bottom.
FIG. 23 shows the telescopic cable guiding device in FIG. 21, shown from the end of the top.

FIGS. 7-9 disclose an embodiment of a lifting column 36 for height-adjustable desks or sitting/standing tables, as they are known. FIG. 10 schematically discloses a desk 37 with a three-part telescopic lifting column 36 designed as a table leg at each side. The lower end of the telescopic lifting column 36 is secured in a foot 38, while the top of the telescopic lifting column 36 is secured to a supporting surface (not shown) for a table top 39, shown transparent. The telescopic lifting column 36 may, e.g., be of the type disclosed in WO 2004/100632 A1 Linak A/S where the telescopic movement is caused by a linear actuator, as shown in FIG. 8, comprising a spindle unit 41 driven by a motor unit 42 with a worm gear. A control box 43 containing a power supply and control unit for the telescopic lifting columns 36 is mounted under the table top 39, while a control panel 44 is mounted at a front edge of the table top 39. Inside the telescopic lifting column 36, a telescopic cable guiding device 45 (see FIG. 8) for guiding electric cables is mounted together with the linear actuator. This telescopic cable guiding device 45 corresponds to the telescopic cable guiding device 22 described above and consists of three inside each other telescopically arranged plastic tubes 46,47, 48. The outermost tube 48 is located at the top where the spindle unit 41 is thinnest and thus has more room. The outermost tube 48 is, with its upper end, secured to the bottom of the housing 49 of the actuator, in which a hole (not shown) is provided in connection with the tube. The cable or cables being guided through the telescopic cable guiding device 45 may terminate in a plug which is accessible through openings in the housing 44, e.g., the cover 50 of the housing. The telescopic cable guiding device 45 is secured with the lower end of the innermost tube 48 to a bottom plate 51 in the outermost, thickest member 52 in the lifting column 36. As the feet 38 of the table 37 are equipped with adjusting screws for adjusting to irregularities in the floor, the feet 38 are as such slightly raised from the floor which thus provides room for guiding cables from, e.g., an outlet 53 in a floor to the telescopic cable guiding device 45. The cable or cables being guided through the lifting column 36 may, e.g., be a mains cable for supplying, e.g., a monitor 54, a desk lamp 55, a control box 43 and a mobile phone 56. It could also be a network cable, e.g., for connecting the computer 57 to the internet, and/or for central controlling of the desk lamp 55 and/or the control box 43. In connection with cleaning, it could, e.g., be expedient to be able to raise the height-adjustable desk 37 and switch on the desk lamp 55. It is noted that the cable or cables are guided discretely from an outlet 53 in the floor to the foot 38, wherefrom the cable is connected to the cable guiding device 36 of the lifting column. If necessary, the lifting columns 36 of the height-adjustable table 37 could be equipped with a cable guiding device, by which one or more corresponding types of cables or other types of cables may be guided.

FIGS. 11-14 show selected elements from inside the telescopic lifting column 1 in FIG. 1, in an extended and retracted position, respectively, but where the telescopic cable guiding device 58 comprises an antenna-like guide, around which a spiral cable 29 is guided. The telescopic cable guiding device 58 thus comprises three telescopically arranged profiles 59,60,61, which, e.g., could have a tubular cross-section. The innermost profile 59 can slide into the intermediate profile 60 and the intermediate profile 60 can slide into the outermost profile 61. For reasons of clarity, the three members 2,3,4 (see FIG. 1) of the lifting column are not shown. Instead the top plate 31 is shown mounted on the upper end of the innermost member 4, the bottom plate 62 is mounted on the lower end of the innermost member 4, the bottom plate 32 is mounted on the lower end of the intermediate member 2, and the bottom plate 27 is mounted on the lower end of the outermost member 2. The outermost profile 61 is with its lower end secured to the bottom plate 27 (see FIG. 13) through the collar 64. The spiral cable 29 is with the bracket 65 fixed to and thus guided along the bottom plate 27 and further through the outermost member 2 through a sleeve 66. In an alternative embodiment, the spiral cable 29 could be led through the bottom plate 27 or be connected to a plug in the bottom plate 27 or in the bottom of the outermost member 2 (see FIG. 15). The upper end of the innermost profile 59 is secured to the top plate 31 through a bracket 67. The spiral cable 29 is guided through a hole (not shown) in the bottom of the bracket 67, past the electric motor 10 and further out through the top plate 31 through a sleeve 68. The telescopic cable guiding device 58 is thus extended and retracted concurrently with the movement of the lifting column. As stated earlier, the innermost member 4 and intermediate member 3 of the lifting column move synchronous. A synchronous movement of the members 3,4 is not necessary as regards the telescopic cable guiding device 58 as it is hidden. Ideally, the intermediate profile 60 is brought along by the innermost profile 59 in that the latter, at its upper end, has an external dog (not shown) which is caught against an internal dog (not shown) in the upper end of the intermediate profile 60. Whether or not the friction between the two profiles 59,60 causes the intermediate profile 60 to be brought along from the beginning is of secondary importance. In its extended position, the intermediate profile 60 is stopped by an external dog (not shown) in the lower end, which is caught by an internal dog (not shown) in the outermost profile 61. FIG. 15 shows the telescopic lifting column 1 in perspective in a retracted position. The spiral cable 29 is here guided out of the bottom of the outermost member 2 and out of the top plate 31. The telescopic lifting column 1 is here shown as connected to a supply cable 69 and corresponding power supply plug 70 in a power supply socket (not shown) of the type referred to as 71, as shown in FIGS. 17 and 18.

FIG. 16 shows the telescopic lifting column 1, shown in perspective, comprising a plug module 72 mounted on the top plate 31 of the innermost member 4 and thus in extension of the lifting column 1. In the shown embodiment, the plug module 72 comprises a profile piece 73 and a top plate 74 mounted in the upper end of the profile piece 73. The plug module 72 is mounted in extension of the innermost member 4 of the lifting column 1 by means of screws 75, 76, 77, 78. Here, the plug module 72 comprises two plugs, a power supply socket (not shown, see reference number 71 in FIGS. 17 and 18) for the telescopic lifting column 1, and a mains socket (not shown, see reference number 79 in FIGS. 17 and 18). The telescopic lifting column 1 further comprises a mains socket (not shown) in the bottom of the outermost member 2. For illustrative reasons, the sockets in FIG. 16 are here equipped with a corresponding plug and cable piece (not referred to in the drawing).

In FIGS. 17 and 18, the profile piece 73 on the plug module 72 is in all essentials removed such that the rear side of the mains socket 79 and the power supply socket 71 is visible. As shown in FIGS. 11-14, the cable 29 protrudes through the top plate 31. This cable 29, which by means of the telescopic cable guiding device 22, 45, 58 is guided through the telescopic lifting column 1, should be connected to the mains socket 79. For reasons of clarity, this is not shown in the figure. The power supply socket 71 has been moved from its location in the top plate 31, as shown in FIG. 15, to a location in the profile piece 73 next to the mains socket 79. The cable connecting the power supply socket 71 is not shown. The plug module 72 is intended as an optional addition to the telescopic lifting column 1. The plug module may have more or less plugs depending on the specific needs of the user.

FIGS. 15-19 show another embodiment of a telescopic cable guiding device 80, comprising three telescopically arranged profiles 81, 82, 83 for guiding the cable 84. It is noted that the cable 84 in this embodiment is not a spiral cable. The profiles 81 and 82 have a U-shaped cross section and comprise a C-shaped guide 89, 90, 91, 92 intended for mesh with the intermediate profile 83 at the end of each long side 85, 86, 87, 88. The intermediate profile 83 is constituted by two independent flat pieces 93, 94 and comprises a boss 95, 96, 97, 98 at the ends of the cross section, which may mesh with the C-shaped guide 89, 90, 91, 92 on the profiles 81, 82. The two profiles 81, 82 and the intermediate profile 83 form a hollow (not referred to in the drawing), in which part of the cable 84 may be arranged. This can be done such that the cable 84 is led into the hollow at the bottom of the profile 81 and out at the top of the profile 82. In the formed hollow, the cable 84 will with advantage could run in a S-shape or Z-shape (see FIG. 16). In this way, a cable length approximately corresponding to the full length of the three profiles 81, 82, 83 may be accumulated. The telescopic cable guiding device 80 is thus suitable to guide one or more cables inside a lifting column. The telescopic cable guiding device 80 could e.g. be incorporated in a lifting column 1 of type, shown in FIGS. 1 and 15.

Such incorporation may be achieved in that the lower end of the profile 81 is secured to an element in fixed connection with the bottom of the lifting column or e.g. by direct securing to the bottom plate 27 in the outermost member 2 (see FIGS. 1 and 3). The upper end of the profile 82 is by means of e.g. a bracket secured to the top of the innermost member 4 of the lifting column. The intermediate profile 83 is further secured to the lower end of the intermediate member 3 by means of e.g. a snap-lock connection through the hole 99, directly in or via the bracket in the intermediate profile 83. Thus, the telescopic cable guiding device 80 extends and retracts concurrently with the movement of the lifting column. As stated earlier, the innermost 3 and intermediate member 4 of the lifting column move synchronous. The securing of the telescopic cable guiding device 80 in the lifting column likewise causes the two profiles 81, 82 to move synchronous. The combination of this synchronous movement and the securing of the intermediate profile 83 to the intermediate member 3 results in that the three profiles 81, 82, 83 does not fall out of their mutual mesh.

In an alternative embodiment of the telescopic cable guiding device 80, as shown in FIG. 17, only the profiles 81, 82 are secured to the bottom and top, respectively of the lifting column as described earlier. The intermediate profile 83 is, however, not secured to the intermediate member 3, but comprises two dogs 100, 101 instead at each end of the intermediate profile 83. The U-shaped clamp 102 is secured to the outer side of the profile 82. The long sides of the clamp 102 extend over the intermediate profile 83, so that the clamp 102 may mesh with one of the two dogs 100, 101, depending on whether the profile 82 moves in the upwards or downwards direction. The intermediate profile 83 may thus be guided in the same direction as the profile 82. In addition to contributing to that the intermediate profile 83 moves in the desired direction, this alternative embodiment of the telescopic cable guiding device further ensures that the individual profiles 81, 82, 83 does not fall out of mesh with each other via the C-shaped guides 89, 90, 91, 92 and the bosses 95, 96, 97, 98.

Figure 24:
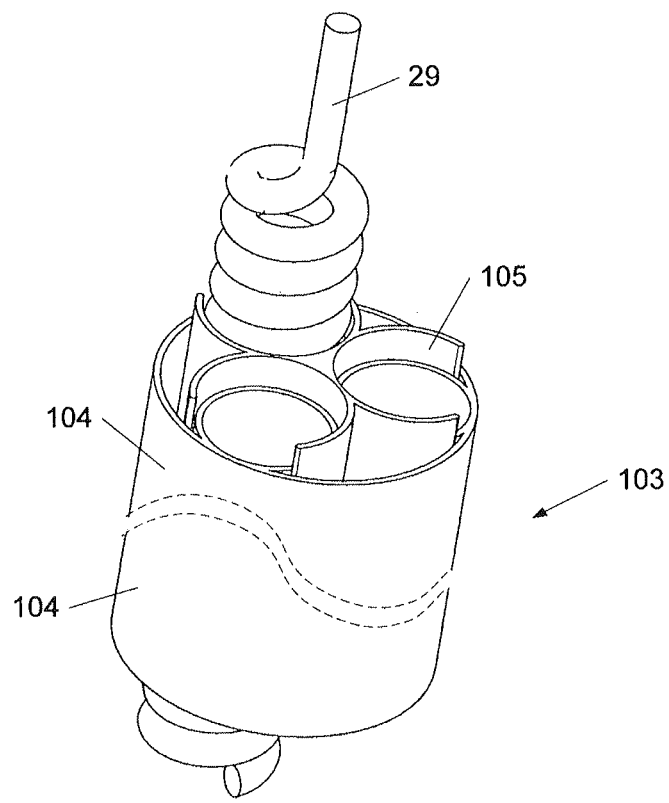
FIG. 24 shows an embodiment of a telescopic cable guiding device comprising a cable, shown in perspective.
Figure 25:
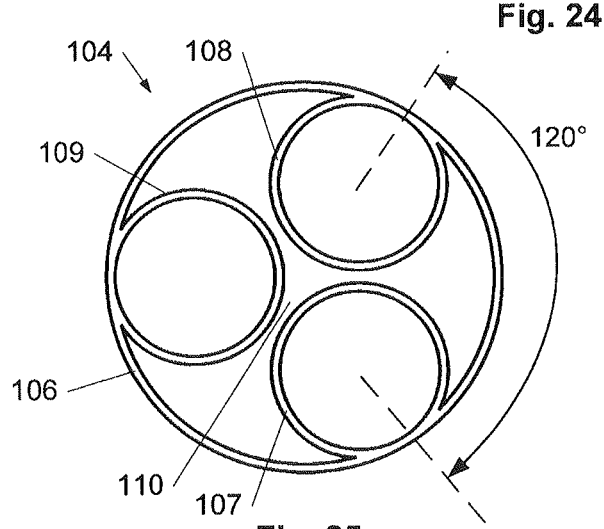
FIG. 25 shows a cross section of the outer profile of the telescopic cable guiding device, shown in FIG. 24.
Figure 26:
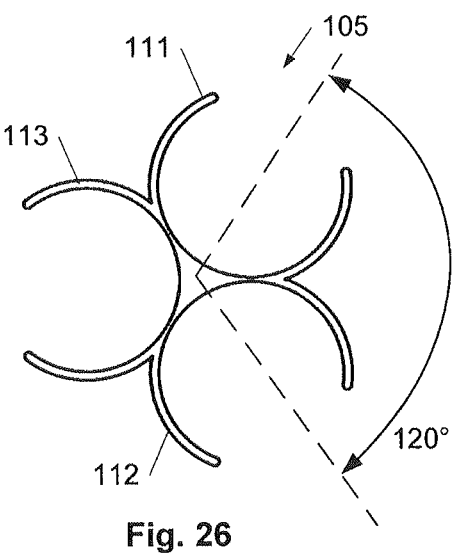
FIG. 26 shows a cross section of the innermost profile of the telescopic cable guiding device, shown in FIG. 24.

FIG. 24 shows another embodiment of a telescopic cable guiding device 103, comprising two telescopically arranged profiles, an outermost profile 104 and an innermost profile 105. FIGS. 25 and 26 show a cross section of the outermost profile 104 and the innermost profile 105, respectively. Both profiles 104, 105 are oblong, but are, for reasons of clarity, shown shortened with a cut, so that only the respective ends and a small portion of the profiles 104, 105 are visible. The outermost profile 104 has a circular exterior 106 and further comprises three tubular guides 107, 108, 109. An arc-piece on each of the three tubular guides 107, 108, 109 is secured to the inner side of the circular exterior 106, such that the longitudinal axis of the three tubular guides 107, 108, 109 and the circular exterior 106 are parallel. The three lines, running from the center axis of the circular exterior 106 to the intersection with the center axis of each of the tubular guides 107, 108, 109, is symmetrical to a mutual angle of approximately 120° (degrees). The external sides of the three tubular guides 107, 108, 109 do not touch each other, but together with the circular exterior 106 instead forms an opening 110 in which the innermost profile 105 may be inserted. The innermost profile 105 comprises three C-shaped pieces 111, 112, 113 joined back to back, so that the horizontal center lines through each of the C-shaped guides 111, 112, 113 are placed with a mutual angle of approximately 120° (degrees). The innermost profile 105 may thus be extended into the opening 110 in the outermost profile 104. Together, the three tubular guides 107, 108, 109 and the three C-shaped guides 111, 112, 113 form a telescopically displaceable cable guide, preferably for a spiral cable 29. The telescopic cable guiding device 103 may, like the other embodiments of the telescopic cable guiding device 22, 45, 58, be secured inside a telescopic lifting column.

The invention claimed is:

1. A telescopic lifting column comprising:
   at least two mutually telescopic members, comprising first and second mutually telescopic members, further comprising a third mutually telescopic member wherein an outermost one of the mutually telescopic members includes a first plate and an innermost one of the mutually telescopic members includes a second plate,
   an electric drive unit for moving the telescopic members relative to one another and extending or retracting the telescopic lifting column wherein the electric drive unit is coupled to an intermediate one of the mutually telescopic members and is further coupled with the first plate of the outermost mutually telescopic member and coupled with the second plate of the innermost mutually telescopic member,
   at least one electric cable, and
   a telescopic cable guiding device for guiding said at least one electric cable, said telescopic cable guiding device being positioned inside said at least two telescopic members and extending between and connected to lower and upper ends of the lifting column to extend or retract with extension or retraction of the lifting column, wherein the telescopic cable guiding device is a telescopic tube and wherein the electric cable is guided on an outside of the telescopic tube and wherein the electric cable is guided around the telescopic tube.

2. The telescopic lifting column according to claim 1, wherein the telescopic tube guides at least two electric cables.

3. The telescopic lifting column according to claim 1, wherein the telescopic cable guiding device comprises at least the same number of members as the telescopic lifting column.

4. The telescopic lifting column according to claim 1, wherein at least one end of the telescopic cable guiding tube terminates in one end of the telescopic lifting column.

5. The telescopic lifting column according to claim 1, wherein the telescopic cable guiding device comprises at least one electric cable which extends between one end and the other end of the telescopic cable guiding device, and at least in one end terminates in a plug.

6. The telescopic lifting column according to claim 5, wherein the plug is a branch plug with more outlets.

7. The telescopic lifting column according to claim 5, wherein said at least one electric cable is a first electric cable that terminates in at least a first plug, and at least a second electric cable terminates in at least a second plug.

8. The telescopic lifting column according to claim 1, including at least one plug module with at least one plug wherein said at least one plug module is mounted to one of the mutually telescopic members of the telescopic lifting column.

9. The telescopic lifting column according to claim 8, wherein said at least one plug module is mounted in continuation of the telescopic lifting column.

10. The telescopic lifting column according to claim 9, wherein said at least one plug module is mounted in continuation of a top of the telescopic lifting column.

11. The telescopic lifting column according to claim 9, wherein said at least one plug module is mounted in continuation of a bottom of the telescopic lifting column.

12. The telescopic lifting column according to claim 9, wherein said at least one plug module is mounted and integrated in one of the at least two mutually telescopic members of the telescopic lifting column.

13. The telescopic cable lifting column according to claim 1, including means for securing the telescopic cable guiding device in the lifting column.

14. The telescopic cable lifting column according to claim 1, comprising a finished mountable unit with a first predetermined number and type of cables and a second predetermined number and type of plugs, configured for mounting in or in connection with the lifting column.

15. The telescopic lifting column according to claim 1, wherein the at least one electric drive unit is located at an upper end of the telescopic lifting column.

16. The telescopic lifting column according to claim 1 further comprising a chain unit secured to the intermediate mutually telescopic member wherein the chain unit is driven by the electric drive unit.

17. The telescopic lifting column according to claim 16 wherein the chain unit includes a first rod connected to the first plate of the outermost mutually telescopic member which is a first, bottom plate and a second rod connected to the second plate of the innermost mutually telescopic member which is a second, top plate.

* * * * *